(12) United States Patent
Komatsu

(10) Patent No.: US 8,913,606 B2
(45) Date of Patent: Dec. 16, 2014

(54) COMMUNICATION SYSTEM, COMMUNICATION DEVICE, COMMUNICATION METHOD AND PROGRAM

(75) Inventor: Masahiro Komatsu, Tokyo (JP)

(73) Assignee: NEC Corporation, Tokyo (JP)

(*) Notice: Subject to any disclaimer, the term of this patent is extended or adjusted under 35 U.S.C. 154(b) by 89 days.

(21) Appl. No.: 13/319,240

(22) PCT Filed: Apr. 21, 2010

(86) PCT No.: PCT/JP2010/057520
§ 371 (c)(1),
(2), (4) Date: Nov. 7, 2011

(87) PCT Pub. No.: WO2010/128636
PCT Pub. Date: Nov. 11, 2010

(65) Prior Publication Data
US 2012/0051210 A1 Mar. 1, 2012

(30) Foreign Application Priority Data
May 8, 2009 (JP) .................... 2009-113953

(51) Int. Cl.
H04L 12/66 (2006.01)
H04L 12/28 (2006.01)
H04L 1/00 (2006.01)
H04L 1/16 (2006.01)
H04L 1/18 (2006.01)

(52) U.S. Cl.
CPC ............ *H04L 1/1621* (2013.01); *H04L 1/1848* (2013.01); *H04L 1/1887* (2013.01)
USPC .......................................................... 370/356

(58) Field of Classification Search
None
See application file for complete search history.

(56) References Cited

U.S. PATENT DOCUMENTS

| 6,021,516 A * | 2/2000 | Okajima et al. ............... 714/748 |
| 6,189,122 B1 * | 2/2001 | Cheng ............................ 714/748 |
| 6,895,010 B1 * | 5/2005 | Chang et al. ................... 370/394 |

(Continued)

FOREIGN PATENT DOCUMENTS

| CN | 1166739 A | 12/1997 |
| CN | 1463508 A | 12/2003 |

(Continued)

OTHER PUBLICATIONS

International Search Report for PCT/JP2010/057520 mailed Aug. 10, 2010.

(Continued)

*Primary Examiner* — Melanie Jagannathan
(74) *Attorney, Agent, or Firm* — Sughrue Mion, PLLC

(57) ABSTRACT

Disclosed are a communication system, a communication device, a communication method, and a program all for preventing disconnection of communication during re-transmission in response to an automatic repeat request in a confirmation mode. The communication system is provided with a first communication device including data transmitting means and data re-transmitting means and a second communication device connected to the first communication device and including data receiving means for receiving data transmitted from the first communication device and data re-transmission requesting means for requesting re-transmission of data not normally received by the data receiving means. The data receiving means determines whether or not the re-transmission data requested by the data re-transmission requesting means will be re-transmitted from the first communication device.

10 Claims, 13 Drawing Sheets

(56) References Cited

U.S. PATENT DOCUMENTS

| | | | |
|---|---|---|---|
| 7,114,002 B1* | 9/2006 | Okumura et al. | 709/232 |
| 7,180,896 B1* | 2/2007 | Okumura | 370/394 |
| 2002/0122434 A1* | 9/2002 | Ido et al. | 370/501 |
| 2003/0156596 A1 | 8/2003 | Sumasu et al. | |
| 2004/0153766 A1* | 8/2004 | Yamamoto et al. | 714/18 |
| 2006/0150050 A1* | 7/2006 | Choi et al. | 714/748 |
| 2006/0215678 A1* | 9/2006 | Aoki | 370/412 |
| 2008/0189586 A1* | 8/2008 | Ike | 714/748 |
| 2009/0235139 A1* | 9/2009 | Park et al. | 714/750 |
| 2009/0249152 A1* | 10/2009 | Higeta et al. | 714/748 |

FOREIGN PATENT DOCUMENTS

| | | | |
|---|---|---|---|
| CN | 101292458 A | 10/2008 | |
| EP | 1 596 522 A2 | 11/2005 | |
| EP | 1 617 584 A2 | 1/2006 | |
| EP | 1 677 449 A2 | 7/2006 | |
| EP | 2 023 524 A2 | 2/2009 | |
| JP | 2005039601 A | 2/2005 | |
| JP | 200532317 A | 11/2005 | |
| JP | 2006033156 A | 2/2006 | |
| JP | 2009044695 A | 2/2009 | |
| JP | 2009513063 A | 3/2009 | |

OTHER PUBLICATIONS

Chinese Office Action for CN Application No. 201080026793.4 issued on Jun. 5, 2014 with English Translation.

3GPP, "3rd Generation Partnership Project; Technical Specification Group Radio Access Network; Evolved Universal Terrestrical Radio Access (E-UTRA) Radio Link Control (RLC) protocol specification (Release 8)", 3GPP TS36.322, V8.5.0, Mar. 2009, [Internet] <URL: http://www.3gpp.org.ftp/Specs/archive/36_series/36.322/36322-850.zip>. Cited in JP Office Action.

Japanese Office Action for JP Application No. 2011-512341 mailed on Aug. 19, 2014 with English Translation.

* cited by examiner

Fig.6

| D/C | RF | P | FI | E | SN |
|-----|----|----|----|---|----|
| SN ||||||
| Data ||||||

Fig.7

| D/C | CPT | ACK_SN |
|-----|-----|--------|
| ACK_SN || E1 |
| NACK_SN |||
| E1 | E2 | NACK_SN |
| NACK_SN | E1 | E2 |
| SOstart |||
| SOstart || SOend |
| SOend |||
| SOend || NACK_SN |
| |||

Fig.8

| D/C | CPT | UNTX_SN | | |
|---|---|---|---|---|
| UNTX_SN | | | E1 | E2 |
| UNTX_SN | | | | |
| UNTX_SN | E1 | E2 | SOstart | |
| SOstart | | | | |
| SOstart | | SOend | | |
| SOend | | | | |
| SOend | UNTX_SN | | | |
| | | | | |

COMMUNICATION SYSTEM, COMMUNICATION DEVICE, COMMUNICATION METHOD AND PROGRAM

TECHNICAL FIELD

The present invention relates to a communication system, a communication device, a communication method and a program, and in particular, relates to a mobile communication system, a radio base station device, a mobile station device, a radio communication method and a program which communicate via a radio link.

BACKGROUND ART

In a mobile communication system such as a cellular phone, a communication system of an LTE (Long Term Evolution type) method which reduces transmission delay and connection delay than usual is spreading.

An entire structure of a radio access network in the mobile communication system of the related LTE method (E-UTRAN: Evolved Universal Terrestrial Radio Access Network) will be described with reference to FIG. 12.

A mobile communication system 1001 of the LTE method includes: a mobile station 1050 called as UE (User Equipment), and a radio base station 1060 called as eNB (E-UTRAN Node B). Between the mobile station 1050 and the base radio station 1060, communication is performed via a radio link (RL) 70.

The mobile station 1050 includes: a PDCP (Packet Data Convergence Protocol) sublayer 1051, an RLC (Radio Link Control) sublayer 1052, an MAC (Medium Access Control) sublayer 1053, a Physical layer 1054 and a radio unit 1055. The radio base station 1060 includes: a PDCP sublayer 1061, an RLC sublayer 1062, a MAC sublayer 1063, a physical layer 1064 and a radio unit 1065.

Next, a structure of the RLC sublayer 1062 in the radio base station 1060 and the RLC sublayer 1052 in the mobile station 1050 of the related mobile communication system 1001 will be described with reference to FIGS. 13 and 14.

The RLC sublayer 1062 in the radio base station 1060 includes: an RLC_SDU (Service Data Unit) receiving unit 1080, a transmission buffer 1081, an RLC_PDU (Protocol Data Unit) generating unit 1082, an RLC_PDU transmitting unit 1083, a re-transmission buffer 1084, an RLC_PDU receiving unit 1085, a reception buffer 1086, an RLC_SDU generating unit 1087, an RLC_SDU transmitting unit 1088, a transmission control information memory unit 1089 and a reception control information memory unit 1090.

Also, the RLC sublayer 1052 in the mobile station 1050 includes: an RLC_PDU receiving unit 1100, a reception buffer 1101, an RLC_SDU generating unit 1102, an RLC_SDU transmitting unit 1103, a re-transmission buffer 1104, an RLC_SDU receiving unit 1105, a transmission buffer 1106, an RLC_PDU generating unit 1107, an RLC_PDU transmitting unit 1108, a transmission control information memory unit 1109 and a reception control information memory unit 1110.

Next, processing of the RLC sublayer 1052 in the mobile station 1050 and the RLC sublayer 1062 in the radio base station 1060 of the mobile communication system 1001 shown in FIG. 12 will be described with reference to FIGS. 12 to 14. Concerning the processing of the RLC sublayers 1052 and 1062, although there are TM (Transparent Mode), UM (Unacknowledged Mode) and AM (Acknowledged Mode), it will be described with AM below.

As shown in FIG. 12, in a part in which transmission processing is performed in the mobile station 1050 (a part shown with down arrow in the figure), for transmitted C/U plane data, that is, control plane data or user plane data (hereinafter, referred to as data), PDCP processing by the PDCP sublayer 1051, RLC processing by the RLC sublayer 1052, MAC processing by the MAC sublayer 1053 and physical processing by the physical layer 1054 are applied in turn, and data to be transmitted is created. The transmission data is transmitted to the radio link 70 by the radio unit 1055 as a radio signal.

Also, in a part in which reception processing is performed in the mobile station 1050 (a part shown with up arrow in the figure), the radio signal from the radio link 70 is received by the radio unit 1055, and for the received signal, physical processing by the physical layer 1054, MAC processing by the MAC sublayer 1053, RLC processing by the RLC sublayer 1052 and PDCP processing by the PDCP sublayer 1051 are applied to the received data in turn. From the data to which a series of processing is applied, data transmitted from the transmission-side is extracted (received).

Also in a part in which transmission processing is performed in the radio base station 1060 (a part shown with up arrow in the figure), for the data transmitted, PDCP processing by the PDCP sublayer 1061, RLC processing by the RLC sublayer 1062, MAC processing by the MAC sublayer 1063 and physical processing by the physical layer 1064 are applied in turn. Data to which a series of processing is applied is transmitted to the radio link 70 by the radio unit 1065 as a radio signal.

Also in a part in which reception processing is performed in the radio base station 1060 (a part shown with down arrow in the figure), the radio signal from the radio link 70 is received by the radio unit 1065, and for the received data physical processing by the physical layer 1064, MAC processing by the MAC sublayer 1063, RLC processing by the RLC sublayer 1062 and PDCP processing by the PDCP sublayer 1061 are applied in turn. From the data to which a series of processing is applied, data transmitted from transmission-side is extracted (received).

As shown in FIGS. 13 and 14, the RLC_SDU receiving unit 1080 of the RLC sublayer 1062 in the radio base station 1060 receives RLC_SDU from the PDCP sublayer 1061 and stores it in the transmission buffer 1081. The RLC_PDU generating unit 1082 acquires data required for transmission from the transmission control information memory unit 1089, the re-transmission buffer 1084 and the transmission buffer 1081, and generates RLC_PDU.

When the RLC_PDU generating unit 1082 generates RLC_PDU, the RLC_PDU generating unit 1082 adds RLC_SN (Sequence Number) to an RLC header. The RLC header includes a polling bit. By setting the polling bit, a report of receiving condition of the mobile station 1050 is requested.

Generated RLC_PDU is, in preparation for ARQ (Automatic Repeat request) re-transmission, stored in the re-transmission buffer 1084 and transmitted to the MAC sublayer 1063 in the radio base station 1060 by the RLC_PDU transmitting unit 1083. RLC_PDU transmitted to the MAC sublayer 1063 is sent to the radio unit 65 via the physical layer 1064. RLC_PDU is sent to the mobile station 1050 via the radio link 70 from the radio unit 1065.

In the mobile station 1050, RLC_PDU sent from the radio base station 1060 is received by the radio unit 1055 via the radio link 70. Received RLC_PDU is received, via the physical layer 1054, by the RLC_PDU receiving unit 1100 of the RLC sublayer 1052 from the MAC sublayer 1053 in the mobile station 1050.

The RLC_PDU receiving unit 1100 stores, among RLC_PDU received from the MAC sublayer 1053, transmission control information from the radio base station 1060 in the reception control information memory unit 1110 and stores other information in the reception buffer 1101.

The RLC_SDU generating unit 1102 acquires RLC_PDU from the reception buffer 1101 and generates RLC_SDU. Generated RLC_SDU is transmitted to the PDCP sublayer 1051 in the mobile station 1050 from the RLC_SDU transmitting unit 1103.

Also, in case received RLC_PDU includes a request to report receiving condition, or in case it includes a request to detect reception failure and to report receiving condition, the reception buffer 1101 stores information of "request to report receiving condition" or "request to detect reception failure and to report receiving condition" among the received RLC_PDU in the transmission control information memory unit 1109.

Also, the transmission control information memory unit 1109 forwards information of "request to report receiving condition" or "request to detect reception failure and to report receiving condition" stored in the transmission control information memory unit 1109 to the RLC_PDU generating unit 1107.

When the RLC_PDU generating unit 1107 receives information of "request to report receiving condition" or "request to detect reception failure and to report receiving condition" forwarded from the transmission control information memory unit 1109, it prepares for generation of transmission control information. The RLC_PDU generating unit 1107 generates, while generating RLC_PDU, transmission control information which replies to "request to report receiving condition" or "request to detect reception failure and to report receiving condition".

As stated above, in the RLC_PDU generating unit 1107, transmission control information which notifies whether or not the mobile station 1050 has received RLC_PDU by using RLC_SN as ACK (ACKnowledgement)/NACK (Negative ACKnowledgement) is generated.

Processing in data transmission from the mobile station 1050 to the radio base station 1060 is similar to the processing in data transmission from the radio base station 1060 to the mobile station 1050. That is, the RLC_SDU receiving unit 1105 of the RLC sublayer 1052 in the mobile station 1050 receives RLC_SDU from the PDCP sublayer 1051 in the mobile station 1050 and stores it in the transmission buffer 1106. The RLC_PDU generating unit 1107 acquires data required for transmission from the transmission control information memory unit 1109, the re-transmission buffer 1104 and the transmission buffer 1106 and generates RLC_PDU.

When the RLC_PDU generating unit 1107 generates RLC_PDU, the RLC_PDU generating unit 1107 adds RLC_SN to an RLC header. The RLC header includes a polling bit. By setting the polling bit, a report of receiving condition of the radio base station 1060 is requested.

Generated RLC_PDU is, in preparation for ARQ re-transmission, stored in the re-transmission buffer 1104 and transmitted to the MAC sublayer 1053 in the mobile station 1050 by the RLC_PDU transmitting unit 1108. RLC_PDU transmitted to the MAC sublayer 1053 is sent to the radio unit 1055 via the physical layer 1054. RLC_PDU is sent to the radio base station 1060 via the radio link 70 from the radio unit 1055.

In the radio base station 1060, RLC_PDU sent from the mobile station 1050 is received by the radio unit 1065 via the radio link 70. Received RLC_PDU is received, via the physical layer 1064, by the RLC_PDU receiving unit 1085 of the RLC sublayer 1062 from the MAC sublayer 1063.

The RLC_PDU receiving unit 1085 stores, among RLC_PDU received from the MAC sublayer 1063, transmission control information from the mobile station 1050 in the reception control information memory unit 1090 and stores other information in the reception buffer 1086.

The RLC_SDU generating unit 1087 acquires RLC_PDU from the reception buffer 1086 and generates RLC_SDU. Generated RLC_SDU is transmitted to the PDCP sublayer 1061 in the radio base station 1060 from the RLC_SDU transmitting unit 1088.

Also, in case received RLC_PDU includes a request to report receiving condition, or in case it includes a request to detect reception failure and to report receiving condition, the reception buffer 1086 stores information of "request to report receiving condition" or "request to detect reception failure and to report receiving condition" among the received RLC_PDU in the transmission control information memory unit 1089.

Also, the transmission control information memory unit 1089 forwards information of "request to report receiving condition" or "request to detect reception failure and to report receiving condition" stored in the transmission control information memory unit 1089 to the RLC_PDU generating unit 1082.

When the RLC_PDU generating unit 1082 receives information of "request to report receiving condition" or "request to detect reception failure and to report receiving condition" forwarded from the transmission control information memory unit 1089, it prepares for generation of transmission control information. The RLC_PDU generating unit 1082 generates, while generating RLC_PDU, transmission control information which replies to "request to report receiving condition" or "request to detect reception failure and to report receiving condition".

As stated above, in the RLC_PDU generating unit 1082, transmission control information which notifies whether or not the radio base station 1060 has received RLC_PDU by using RLC_SN as ACK/NACK is generated.

Above is a communication procedure between the mobile station 1050 and the radio base station 1060 in the related mobile communication system.

A data transmission method which adopts, as mentioned above, automatic repeat request (ARQ) as an error control technology is disclosed, for example, in patent document 1.

CITATION LIST

Patent Document

[Patent document 1] Japanese Patent Application Laid-Open No. 2005-39601

DISCLOSURE OF THE INVENTION

Problems to be Solved by the Invention

In the mobile radio system mentioned above, by an error in a radio zone of the radio link 70, a part which performs transmission processing in the mobile station 1050 or a part which performs transmission processing in the radio base station 1060 may determine transmission control information incorrectly. In particular, in a part which performs transmission processing, when a notification which shows NACK is determined incorrectly as ACK, RLC_PDU held in the re-transmission buffer 1084 in the radio base station 1060 or RLC_PDU held in the re-transmission buffer 1104 in the mobile station 1050 is deleted. Because of this, even if the part which performs transmission processing is requested for re-transmission by the normal NACK notification from a part which performs reception processing after that, RLC_PDU can not be re-transmitted.

If it is not determined that data is received, the part which performs reception processing waits for reception of RLC_PDU which is requested for re-transmission by the NACK notification until the data is received. As a result of the processing, between the part which performs reception processing and the part which performs transmission processing, communication is disconnected.

The present invention is made in view of the points mentioned above, and the object is to provide a communication system, a communication device, a communication method and a program in which a device which requested re-transmission determines whether or not data which is requested for re-transmission is re-transmitted.

Measures for Solving the Problems

In order to solve the problems mentioned above, a communication system according to the present invention includes: a first communication device including data transmitting means and data re-transmitting means; and a second communication device connected to the first communication device and including: data receiving means for receiving data transmitted from the first communication device; and data re-transmission requesting means for requesting re-transmission of data which the data receiving means did not normally receive, wherein the data receiving means determines whether or not the re-transmission data requested by the data re-transmission requesting means is re-transmitted from the first communication device.

A communication device according to the present invention is connected to an opposing communication device including data transmitting means and data re-transmitting means, and includes: data receiving means for receiving data transmitted from the opposing communication device; and data re-transmission requesting means for requesting re-transmission of data which the data receiving means did not normally receive, wherein the data receiving means determines whether or not the re-transmission data requested by the data re-transmission requesting means is re-transmitted from the opposing communication device.

A communication device according to the present invention is connected to an opposing communication device, and includes: data transmitting means for transmitting data to the opposing communication device; data re-transmitting means for re-transmitting, according to a request of re-transmission of data which the opposing communication device did not normally receive, the requested re-transmission data; and re-transmission impossible information transmitting means for transmitting re-transmission impossible information that the re-transmission data is not re-transmitted to the opposing communication device.

A communication method according to the present invention is for communicating between a first communication device and a second communication device connected to the first communication device, and includes: transmitting data from the first communication device to the second communication device; in the second communication device, determining whether or not the data transmitted from the first communication device is normally received; concerning data which was not normally received, requesting re-transmission of the data; and in the second communication device, determining whether or not the requested re-transmission data is re-transmitted from the first communication device.

A storage medium according to the present invention stores a program for communicating a first communication device and a second communication device connected to the first communication device, the program making a computer execute: a step of transmitting data from the first communication device to the second communication device; a step of, in the second communication device, determining whether or not the data transmitted from the first communication device is normally received; a step of, concerning data which is not normally received, requesting re-transmission of the data; and a step of, in the second communication device, determining whether or not the requested re-transmission data is re-transmitted from the first communication device.

Effect of the Invention

According to the present invention, in data communication between communication devices connected via a network, disconnection of the communication in response to an automatic repeat request (ARQ) in a confirmation mode requesting re-transmission of data which is not normally received is prevented.

BRIEF DESCRIPTION OF DRAWINGS

FIG. 6 shows a format of RLC_PDU which is used when an RLC_PDU transmitting unit according to the second and the third exemplary embodiment transmits data.

FIG. 7 shows a format of RLC_PDU which is used when an RLC_PDU transmitting unit according to the second and the third exemplary embodiment transmits transmission control information.

FIG. 8 is a figure showing an example of a format of RLC_PDU which is used when an RLC_PDU transmitting unit according to the second and the third exemplary embodiment transmits re-transmission impossible information.

DESCRIPTION OF EMBODIMENTS

[First Exemplary Embodiment]

Figure 1:
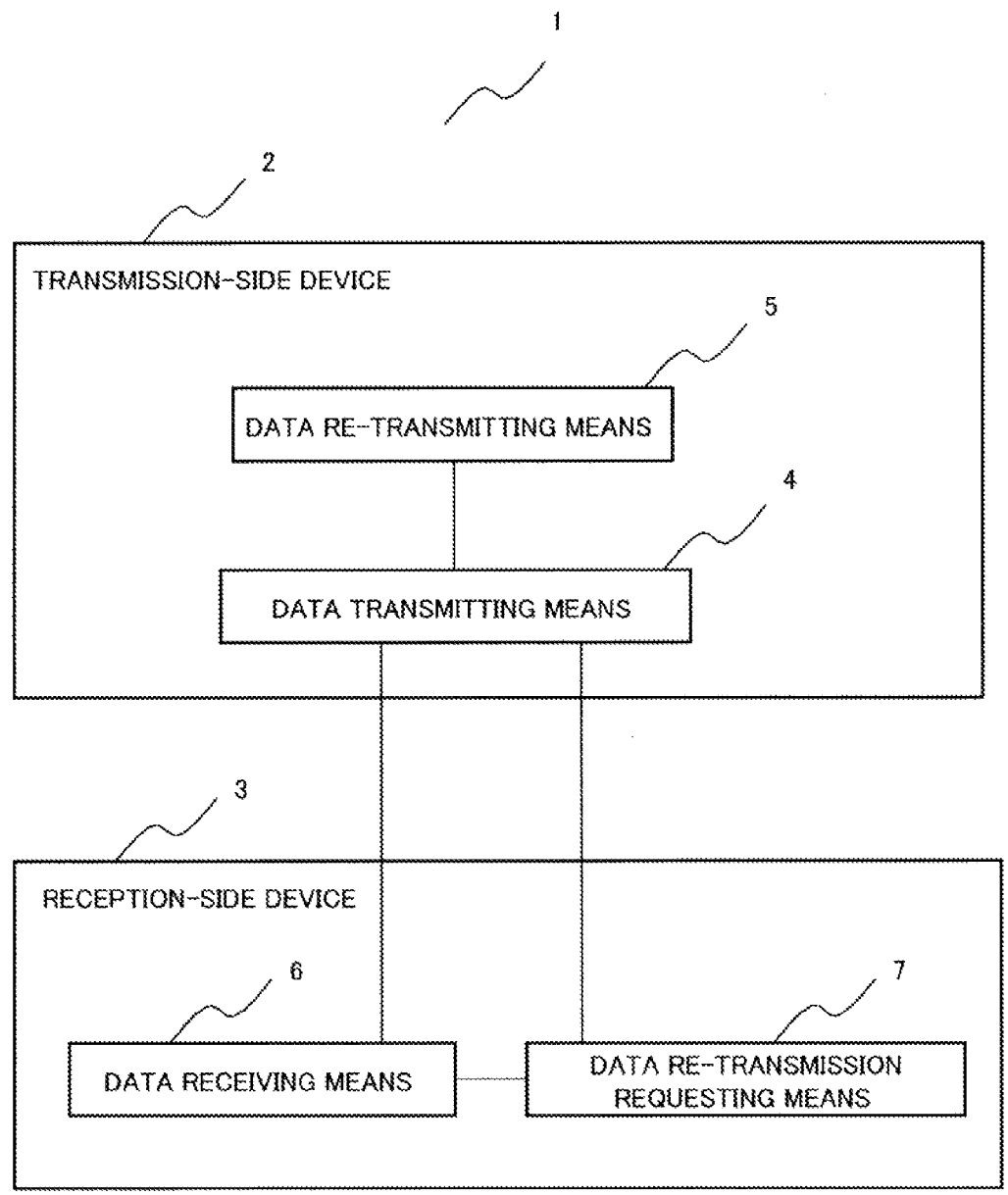
FIG. 1 shows a structure of a communication system according to the first exemplary embodiment.

A communication system according to the first exemplary embodiment of the present invention will be described with reference to FIG. 1.

A communication system 1 includes a transmission-side device 2 and a reception-side device 3 connected to the transmission-side device 2. Communication is performed between the transmission-side device 2 and the reception-side device 3.

The transmission-side device 2 includes data transmitting means 4 which transmits data to the reception-side device 3 and data re-transmitting means 5.

The reception-side device 3 includes data receiving means 6 which receives data transmitted from the transmission-side device 2. The reception-side device 3 further includes data re-transmission requesting means 7.

The data receiving means 6 detects whether or not data transmitted from the transmission-side device 2 is normally received. In case data transmitted from the transmission-side device 2 is not normally received, the data re-transmission requesting means 7 requests re-transmission of the data to the transmission-side device 2.

The data receiving means 6 determines whether or not re-transmission data requested by the data re-transmission requesting means 7 is re-transmitted from the transmission-side device 2.

Figure 2:
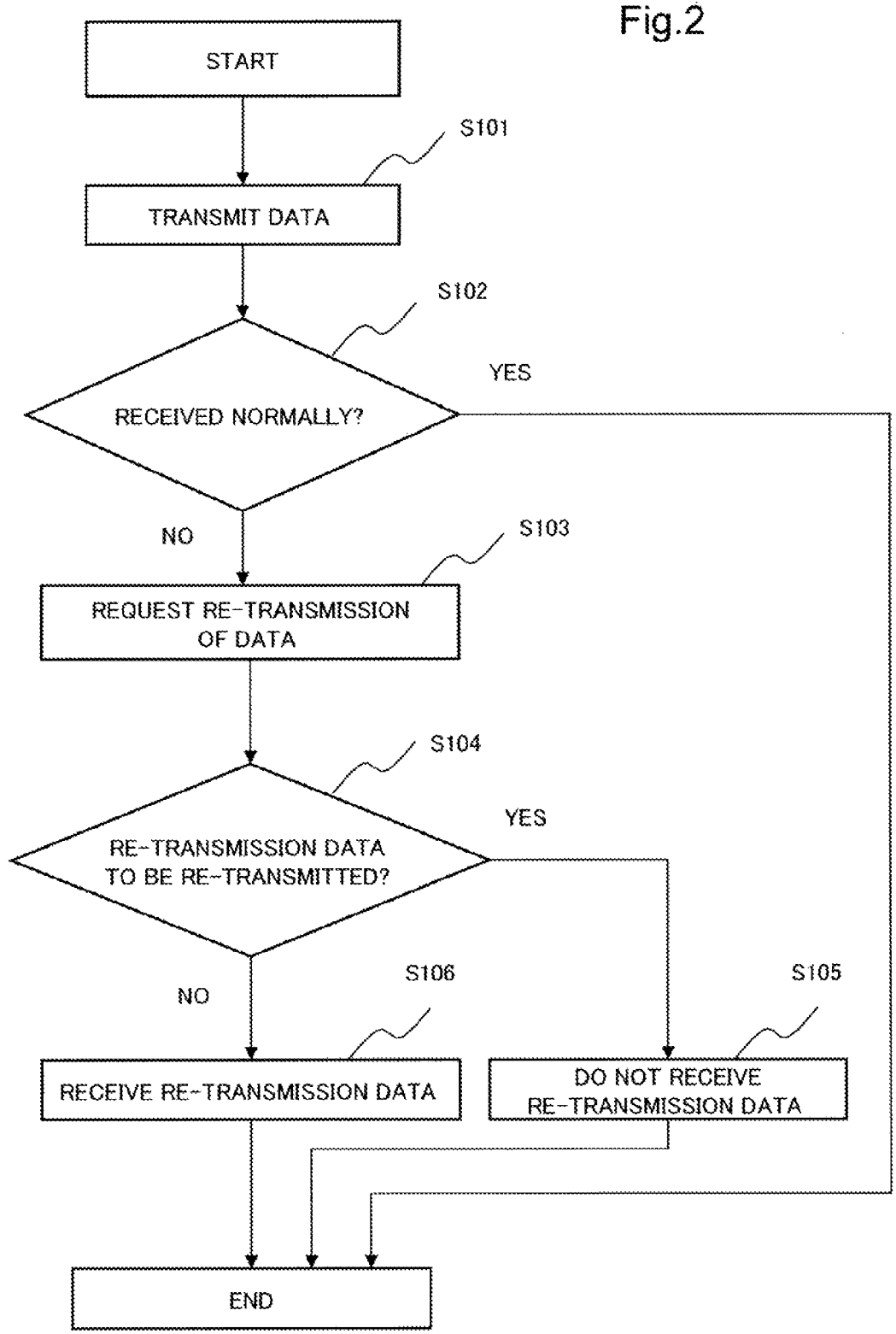
FIG. 2 shows a processing procedure of a communication system according to the first exemplary embodiment.

Next, a communication method in the communication system according to the first exemplary embodiment will be described with reference to FIGS. 1 and 2.

When the data transmitting means 4 of the transmission-side device 2 transmits data to the reception-side device 3 (Step S101), the data receiving means 6 of the reception-side device 3 detects whether or not received data is normally received (Step S102). When the data is normally received (YES of Step S102), ends processing concerning data re-transmission, and proceeds to the next processing.

When the data received by the data receiving means 6 is not normally received (NO of Step S102), the data re-transmission requesting means 7 requests re-transmission of the data to the transmission-side device 2 (Step S103).

After transmitting the data re-transmission request, the data receiving means of the reception-side device 3 determines whether or not the requested re-transmission data is re-transmitted from the transmission-side device 2 (Step S104).

When determined that the re-transmission data is re-transmitted (YES of Step S104), the re-transmission data is re-transmitted and is received by the data receiving means 6 (Step S105).

When determined that the re-transmission data is not re-transmitted (NO of Step S104), the data receiving means 6 ends the processing without receiving the requested re-transmission data.

According to the communication system 1 according to the first exemplary embodiment, in the reception-side device 3, it is determined whether or not re-transmission data from the transmission-side device 2 is re-transmitted according to the request of the re-transmission. As a result, even if the transmission-side device 2 determines transmission control information which controls the data transmitting means 4 incorrectly, a state will not take place where the reception-side device 3 waits for reception of the re-transmission data and communication is disconnected. Accordingly, regardless of the state of a communication path between the transmission-side device 2 and the reception-side device 3, stable communication environment is obtained.

[Second Exemplary Embodiment]

Next, a communication system according to the first exemplary embodiment is applied to a mobile communication system illustrated as a related communication system.

Figure 3:
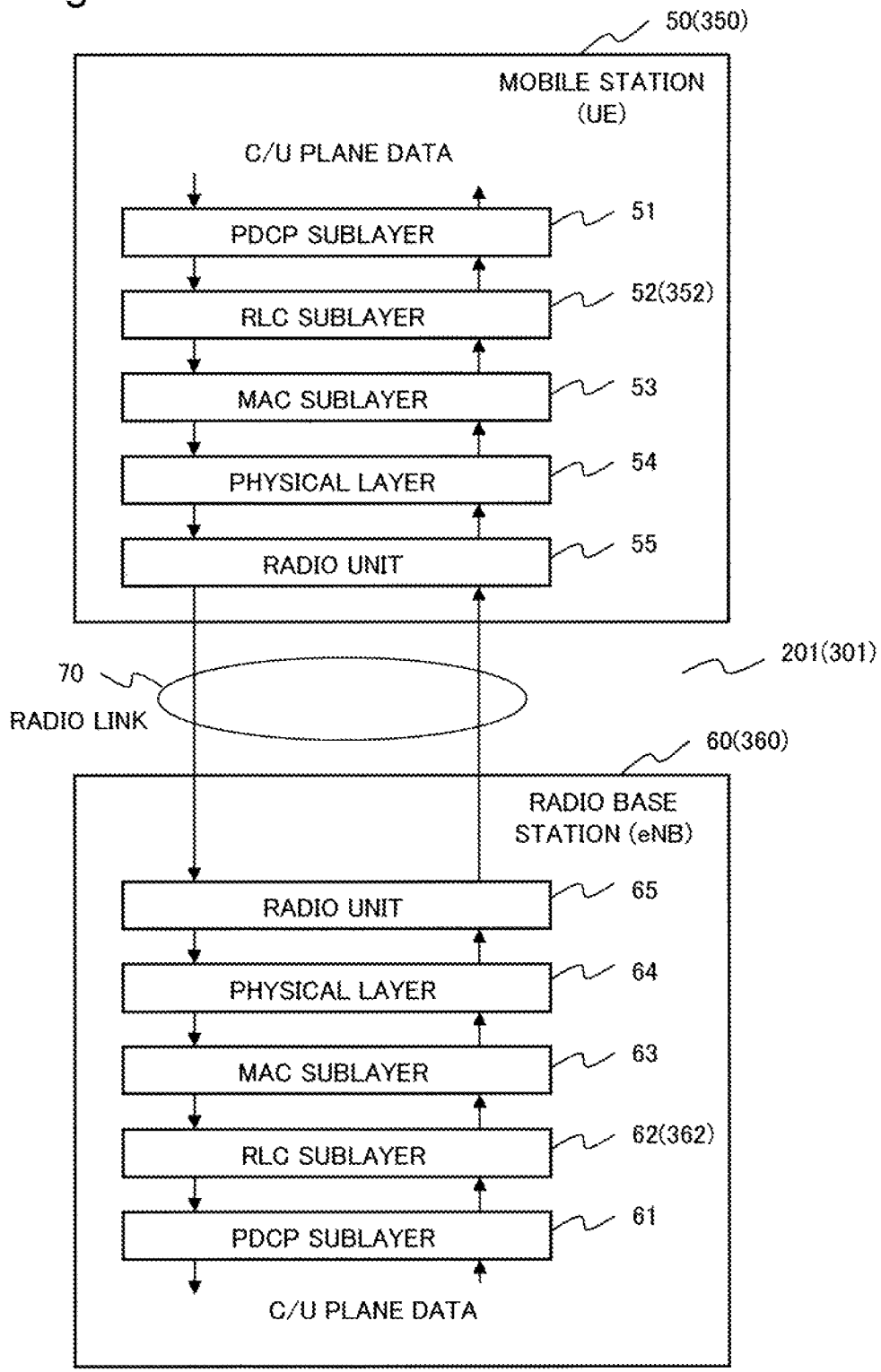
FIG. 3 shows a structure of a mobile communication system according to the second and the third exemplary embodiment.

FIG. 3 shows a structure of a radio access network (E-UTRAN) in a mobile communication system of LTE method according to the second exemplary embodiment of the present invention.

A mobile communication system 201 includes a mobile station 50 called UE and a radio base station 60 called eNB. Communication is performed via a radio link (RL) 70 between the mobile station 50 and the radio base station 60.

The transmission-side device 2 and the reception-side device 3 according to the first exemplary embodiment correspond, according to processing of communication data, to the radio base station 60 and the mobile station 50 or to the mobile station 50 and the radio base station 60 in the second exemplary embodiment respectively.

The mobile station 50 includes a PDCP sublayer 51, an RLC sublayer 52, a MAC sublayer 53, a physical layer 54 and a radio unit 55. The radio base station 60 includes a PDCP sublayer 61, an RLC sublayer 62, a MAC sublayer 63, a physical layer 64 and a radio unit 65.

Further, because the PDCP sublayer 51, the MAC sublayer 53, the physical layer 54 and the radio unit 55 according to the second exemplary embodiment include the same structure and the same function respectively as the PDCP sublayer 1051, the MAC sublayer 1053, the physical layer 1054 and the radio unit 1055 of the related mobile station 1050 described above, their description will be omitted or simplified below.

Also, because the PDCP sublayer 61, the MAC sublayer 63, the physical layer 64 and the radio unit 65 according to the second exemplary embodiment include the same structure and the same function respectively as the PDCP sublayer 1061, the MAC sublayer 1063, the physical layer 1064 and the radio unit 1065 of the related radio base station 1060 described above, their description will be omitted or simplified below.

Figure 4:
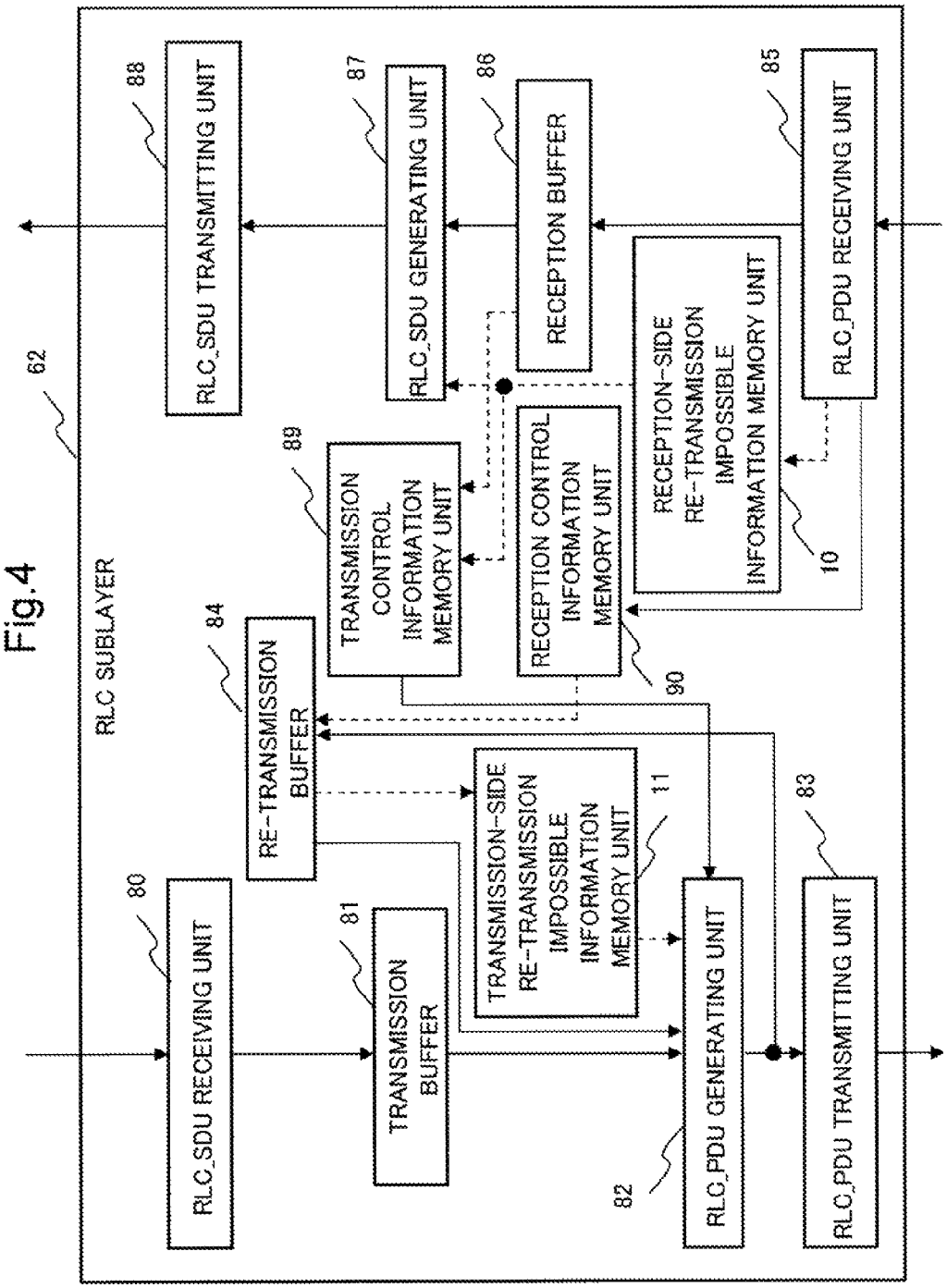
FIG. 4 shows a structure of an RLC sublayer in a radio base station according to the second exemplary embodiment.

FIG. 4 shows a structure of the RLC sublayer 62 in the radio base station 60 according to the second exemplary embodiment.

The RLC sublayer 62 in the radio base station 60 includes an RLC_SDU (Service Data Unit) receiving unit 80, a transmission buffer 81, an RLC_PDU (Protocol Data Unit) generating unit 82, an RLC_PDU transmitting unit 83, a re-transmission buffer 84, an RLC_PDU receiving unit 85, a reception buffer 86, an RLC_SDU generating unit 87, an RLC_SDU transmitting unit 88, a transmission control information memory unit 89 and a reception control information memory unit 90.

Because they include the same structure and the same function respectively as the RLC_SDU receiving unit 1080, the transmission buffer 1081, the RLC_PDU generating unit 1082, the RLC_PDU transmitting unit 1083, the re-transmission buffer 1084, the RLC_PDU receiving unit 1085, the reception buffer 1086, the RLC_SDU generating unit 1087, the RLC_SDU transmitting unit 1088, the transmission control information memory unit 1089 and the reception control information memory unit 1090 of the RLC sublayer 1062 in the related radio base station 1060 described above, their description will be omitted or simplified below.

Figure 5:
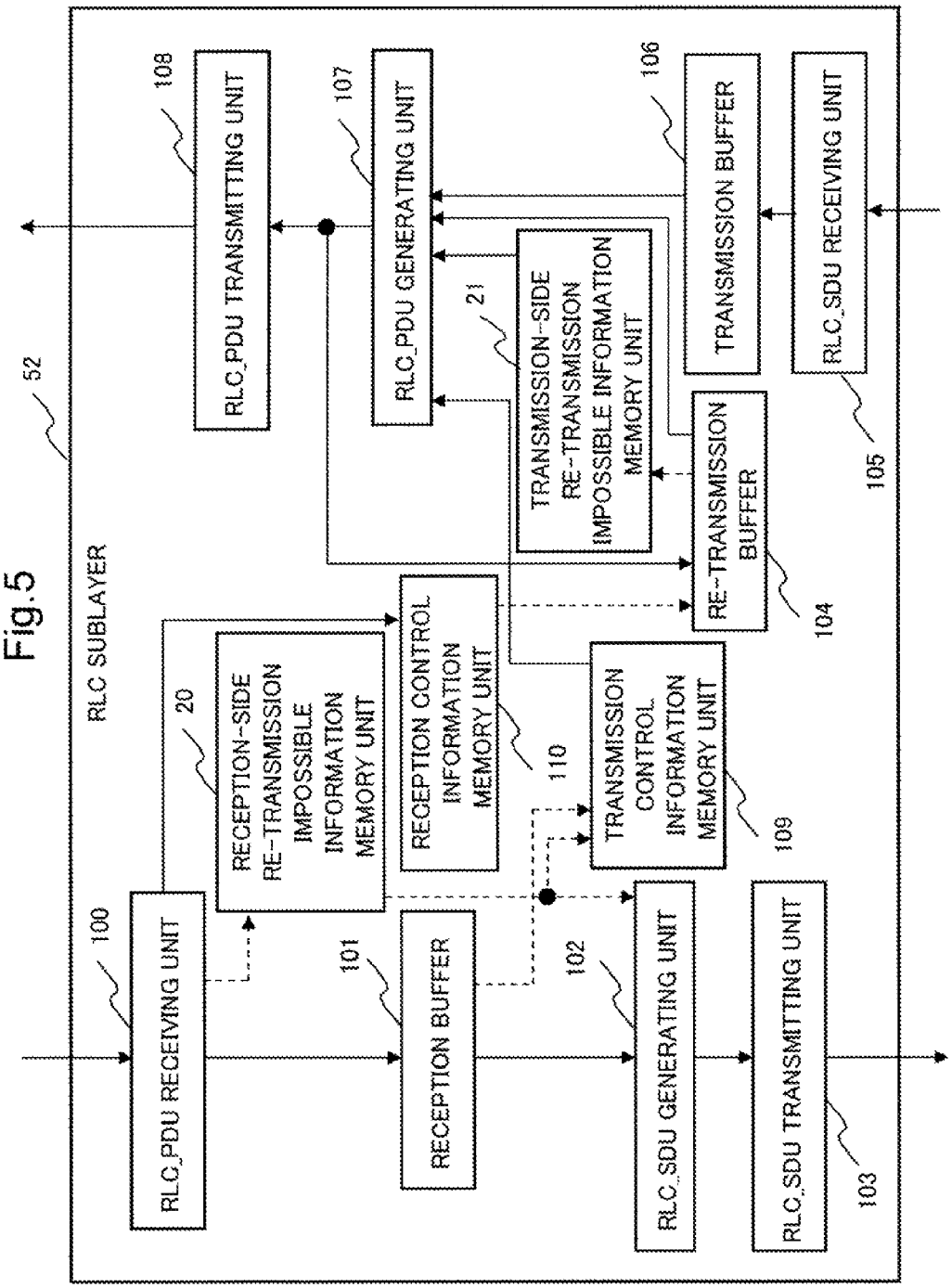
FIG. 5 shows a structure of an RLC sublayer in a mobile station according to the second exemplary embodiment.

FIG. 5 shows a structure of the RLC sublayer 52 in the mobile station 50 according to the second exemplary embodiment.

The RLC sublayer 52 in the mobile station 50 includes an RLC_PDU receiving unit 100, a reception buffer 101, an RLC_SDU generating unit 102, an RLC_SDU transmitting unit 103, a re-transmission buffer 104, an RLC_SDU receiving unit 105, a transmission buffer 106, an RLC_PDU generating unit 107, an RLC_PDU transmitting unit 108, a transmission control information memory unit 109 and a reception control information memory unit 110.

Because they include the same structure and the same function respectively as the RLC_PDU receiving unit 1100, the reception buffer 1101, the RLC_SDU generating unit 1102, the RLC_SDU transmitting unit 1103, the re-transmission buffer 1104, the RLC_SDU receiving unit 1105, the transmission buffer 1106, the RLC_PDU generating unit 1107, the RLC_PDU transmitting unit 1108, the transmission control information memory unit 1109 and the reception control information memory unit 1110 of the RLC sublayer 1052 in the related mobile station 1050 described above, their description will be omitted or simplified below.

The RLC sublayer 62 in the radio base station 60 according to the second exemplary embodiment further includes a reception-side re-transmission impossible information memory unit 10 and a transmission-side re-transmission impossible information memory unit 11. Also, the RLC sublayer 52 in the mobile station 50 further includes a reception-side re-transmission impossible information memory unit 20 and a transmission-side re-transmission impossible information memory unit 21.

In the RLC sublayer 62 in the radio base station 60, the transmission-side re-transmission impossible information memory unit 11, the RLC_PDU generating unit 82 and the RLC_PDU transmitting unit 83 cooperate and function as re-transmission impossible information transmitting means. The reception-side re-transmission impossible information memory unit 10, the RLC_SDU generating unit 87 and the RLC_SDU receiving unit 85 cooperate and function as data receiving means.

Also, in the RLC sublayer 52 in the mobile station 50, the transmission-side re-transmission impossible information memory unit 21, the RLC_PDU generating unit 107 and the RLC_PDU transmitting unit 108 cooperate and function as re-transmission impossible information transmitting means. The reception-side re-transmission impossible information memory unit 20, the RLC_SDU generating unit 102 and the RLC_SDU receiving unit 100 cooperate and function as data receiving means.

Next, operation in the RLC sublayer 62 in the radio base station 60 and in the RLC sublayer 52 in the mobile station 50 according to the second exemplary embodiment will be described with reference to FIGS. 3 to 8.

Further, because the operation in the RLC sublayer 62 in the radio base station 60 is identical with the operation in the RLC sublayer 52 in the mobile station 50, the operation in the RLC sublayer 62 in the radio base station 60 will be described below, and description of the operation in the RLC sublayer 52 in the mobile station 50 is omitted.

The RLC_SDU receiving unit 80 receives RLC_SDU from the PDCP sublayer 61 and stores it in the transmission buffer 81. The RLC_PDU generating unit 82 acquires transmission data from the transmission control information memory unit 89, the transmission-side re-transmission impossible information memory unit 11, the re-transmission buffer 84 and the transmission buffer 81 and generates RLC_PDU.

When RLC_PDU is generated, the RLC_PDU generating unit 82 adds RLC_SN (RLC sequence number) to an RLC header. The RLC header includes a polling bit. By setting the polling bit, a report of receiving condition of the mobile station 50 is requested.

Generated RLC_PDU is stored in the re-transmission buffer 84 in preparation for ARQ (automatic repeat request) re-transmission. Also, RLC_PDU is transmitted to the MAC sublayer 63 from the RLC_PDU transmitting unit 83. RLC_PDU transmitted to the MAC sublayer 63 is sent to the radio unit 65 via the physical layer 64. RLC_PDU is sent from the radio unit 65 to the mobile station 50 via the radio link 70.

When RLC_PDU is transmitted to the mobile station 50 as described above, RLC_PDU is transmitted to the radio base station 60 from the mobile station 50. RLC_PDU sent from the mobile station 50 via the radio link 70 is received by the MAC sublayer 63 via the radio unit 65 and the physical layer 64. The RLC_PDU receiving unit 85 of the RLC sublayer 62 in the radio base station 60 receives RLC_PDU sent from the mobile station 50 from the MAC sublayer 63.

Among RLC_PDU, transmission control information of the mobile station 50 is stored in the reception control information memory unit 90, re-transmission impossible information of the mobile station 50 is stored in the reception-side re-transmission impossible information memory unit 10, and information other than the transmission control information and the re-transmission impossible information included in RLC_PDU is stored in the reception buffer 86.

The RLC_SDU generating unit 87 acquires RLC_PDU from the reception buffer 86 and generates RLC_SDU. At that time, based on the re-transmission impossible information of the mobile station 50 stored in the reception-side re-transmission impossible information memory unit 10, the RLC_SDU generating unit 87 determines RLC_PDU for which re-transmission is shown to be impossible as received, and processes it. That is, RLC_SDU is not generated for the RLC_PDU which is determined that it is impossible to re-transmit and next RLC_SDU will be generated.

RLC_SDU generated in this way is transmitted to the PDCP sublayer 61 from the RLC_SDU transmitting unit 88.

Also, in case the transmission control information of the mobile station 50 stored in the reception control information memory unit 90 includes a request to report receiving condition of the radio base station 60 or a request to detect reception failure and to report receiving condition, this request is forwarded to the re-transmission buffer 84.

When the request mentioned above is received from the re-transmission buffer 84, the RLC_PDU generating unit 82 prepares for generation of transmission control information. When RLC_PDU is generated, the RLC_PDU generating unit 82 generates the transmission control information which replies to the request to report receiving condition of the radio base, station 60 or the request to detect reception failure and to report receiving condition.

By the transmission control information which the RLC_PDU generating unit 82 generates, whether or not RLC_PDU is received is notified to the mobile station 50 from the radio base station 60 by using RLC_SN as ACK/NACK.

Also, the re-transmission impossible information of the mobile station 50 is forwarded from the reception-side re-transmission impossible information memory unit 10 to the transmission control information memory unit 89.

When the re-transmission impossible information of the mobile station 50 mentioned above is received from the transmission control information memory unit 89, the RLC_PDU generating unit 82 generates transmission control information so that, for the RLC_PDU which is notified by the re-transmission impossible information, NACK notification may not be performed and ACK notification may be performed.

Also, the re-transmission buffer 84 manages data according to the received reception control information. At that time, when there exists no data in the re-transmission buffer 84 for which NACK is notified by the reception control information, the re-transmission buffer 84 generates re-transmission impossible information of the radio base station 60 and stores the re-transmission impossible information in the transmission-side re-transmission impossible information memory unit 11.

Above is the description of the operation of the RLC sublayer 62 in the radio base station 60. Next, processing of the mobile communication system which the RLC sublayer 62 in the radio base station 60 and the RLC sublayer 52 in the mobile station 50 perform in cooperation will be described.

The RLC_SDU receiving unit 80 of the RLC sublayer 62 in the radio base station 60 receives RLC_PDU from the PDCP sublayer 61 and stores the RLC_PDU in the transmission buffer 81. When requested by the MAC sublayer 63, the RLC_PDU generating unit 82 generates RLC_PDU.

A request from the MAC sublayer 63 includes a generation size. The RLC_PDU generating unit 82 acquires transmission control information from the transmission control information memory unit 89, re-transmission impossible information from the transmission-side re-transmission impossible information memory unit 11, information from the re-transmission buffer 84 and information from the transmission buffer 81 in this order until the size is reached, and generates RLC_PDU.

FIG. 6 is an example of a format which the RLC_PDU transmitting unit 83 uses when transmitting information acquired from the re-transmission buffer 84 or the transmission buffer 81. The format includes a D/C field, an RF field, a P field, an FI field, an E field, an SN field and a Data field specified in 3GPP_TS_36.322.

The D/C field is a field which shows whether the kind of data to be transmitted is user data or control data. In this example, the field is set as user data.

The RF field is a field which shows, when RLC_PDU is re-transmitted, whether or not data is subdivided. The RF field is set according to the existence of subdivision.

The P field is a field which shows whether or not control information which shows receiving condition is requested to an opposing device. The P field is set according to the existence of the request.

The FI field is a field which shows whether or not head of the Data field is head of RLC_SDU, and end of the Data field is end of RLC_SDU, and is set according to a state of mapping of RLC_SDU.

The E field is a field which shows whether or not a plurality of RLC_SDU is mapped to RLC_PDU. The E field is set according to a state of mapping of RLC_SDU.

The SN field is a number which identifies RLC_PDU. The SN field is incremented for each new data. Also, for re-transmission data, a number at a time of new transmission is given to the SN field.

The Data field includes one or a plurality of RLC_SDU (or part of RLC_SDU). When a plurality of RLC_SDU (or part of RLC_SDU) is mapped to one RLC_PDU, an LI field (not shown in FIG. 6) which shows length of RLC_SDU (or part of RLC_SDU) is set. With this format, RLC_SDU is transmitted as RLC_PDU.

Also, FIG. 7 is an example of a format which the RLC_PDU transmitting unit 83 uses when transmitting transmission control information stored in the transmission control information memory unit 89. The format includes a D/C field, a CPT field, an ACK_SN field, an E1 field, an E2 field, a NACK_SN field, an SOstart field and an SOend field specified in 3GPP_TS_36.322.

The D/C field is same as the D/C field described above.

In the CPT field, it is set as control information which shows receiving condition of RLC_PDU In the ACK_SN field, in case all NACK is notified, a sequence number (SN) of RLC_PDU to be received next, and otherwise, SN of the first RLC_PDU for which NACK is not notified, will be set.

The E1 field is a field which shows whether or not there exists NACK_SN. The E1 field is set according to the existence of NACK_SN.

The E2 field is a field which shows whether or not there exist SOstart and SOend. The E2 field is set according to the existence of SOstart and SOend.

In the NACK_SN field, SN of RLC_PDU which could not be received is set.

In the SOstart field, when part of RLC_PDU is received, starting position of the part which was not received is set.

In the SOend field, when part of RLC_PDU is received, end position of the part which was not received is set.

Using the format shown in FIG. 7, the RLC_PDU transmitting unit 83 notifies receiving condition of RLC_PDU or part of RLC_PDU.

Also, FIG. 8 shows an example of a format which the RLC_PDU transmitting unit 83 uses when transmitting re-transmission impossible information stored in the transmission-side re-transmission impossible information memory unit 11. The format includes a D/C field, a CPT field, a UNTX_SN field, an E1 field, an E2 field, an SOstart field and an SOend field specified in 3GPP_TS_36.322.

The D/C field, the CPT field, the E2 field, the SOstart field and the SOend field are same as the D/C field, the CPT field, the E2 field, the SOstart field and the SOend field described above respectively.

In the UNTX_SN field, a sequence number (SN) of RLC_PDU which is impossible to re-transmit is set.

The E1 field is a field which shows whether or not UNTX_SN continues. The E1 field is set according to the existence of UNTX_SN.

Using the format shown in FIG. 8, the radio base station 60 notifies the mobile station 50 of re-transmission impossible information concerning RLC_PDU or part of RLC_PDU as ACK/NACK.

Among data held in the transmission buffer 81, data which was used by the RLC_PDU generating unit 82 is deleted. RLC_PDU which was generated in the RLC_PDU generating unit 82 using data held in the transmission buffer 81 is sent to the RLC_PDU transmitting unit 83. Also, the RLC_PDU is stored in the re-transmission buffer 84 as the data transmitted.

In the re-transmission buffer 84, data waiting for re-transmission and data transmitted are stored. The RLC_PDU generating unit 82 uses the data waiting for re-transmission. The data waiting for re-transmission which RLC_PDU generating unit 82 used will be the data transmitted. Although RLC_PDU which the RLC_PDU generating unit 82 generated using the data waiting for re-transmission in the re-transmission buffer 84 is sent to the RLC_PDU transmitting unit 83, the RLC_PDU is not stored in the re-transmission buffer 84 as the data transmitted.

Although RLC_PDU which the RLC_PDU generating unit 82 generated using transmission control information stored in the transmission control information memory unit 89 and re-transmission impossible information of the radio base station 60 stored in the transmission-side re-transmission impossible information memory unit 11 is sent to the RLC_PDU transmitting unit 83, the RLC_PDU is not stored in the re-transmission buffer 84.

The RLC_PDU transmitting unit 83 transmits RLC_PDU generated by the RLC_PDU generating unit 82 to the MAC sublayer 63. RLC_PDU transmitted to the MAC sublayer 63 is sent, via the physical layer 64 and the radio unit 65, to the mobile station 50 via the radio link 70.

RLC_PDU sent from the radio base station 60 is received, via the radio link 70, by the MAC sublayer 53 via the radio unit 55 and the physical layer 54. The RLC_PDU receiving unit 100 in the mobile station 50 receives the RLC_PDU from the MAC sublayer 53.

Among RLC_PDU, transmission control information of the radio base station 60 is stored in the reception control information memory unit 110, and re-transmission impossible information is stored in the reception-side re-transmission impossible information memory unit 20. Information other than the transmission control information and the re-transmission impossible information included in the RLC_PDU is stored in the reception buffer 101.

The reception buffer 101 manages whether or not there exists a lack in reception of RLC_PDU using a sequence number (SN) of RLC_PDU.

When RLC_PDU which follows the RLC_PDU corresponding to the last end of RLC_PDU generated last time is received, the RLC_PDU generating unit 102 acquires the RLC_PDU from the reception buffer 101 and generates RLC_SDU.

RLC_PDU which is, based on re-transmission impossible information of the radio base station 60 stored in the reception-side re-transmission impossible information memory unit 20, determined that it is impossible to receive at the mobile station 50 because the radio base station 60 does not re-transmit, interrupts the continuity mentioned above. The RLC_PDU generating unit 102 acquires next RLC_PDU excluding such RLC_PDU.

When there exists RLC_PDU which is received consecutively just after excluded RLC_PDU, the RLC_SDU generating unit 102 acquires the RLC_PDU which is received consecutively and generates RLC_SDU.

RLC_SDU generated by the RLC_SDU generating unit 102 is sent to the RLC_PDU transmitting unit 103, and is transmitted to the PDCP sublayer 51 from the RLC_PDU transmitting unit 103.

Also, the RLC_SDU receiving unit 105 of the RLC sublayer 52 in the mobile station 50 receives RLC_SDU from the PDCP sublayer 51 and stores received RLC_SDU in the transmission buffer 106. And when requested by the MAC sublayer 53, the RLC_PDU generating unit 107 generates RLC_PDU.

A request from the MAC sublayer 53 includes a generation size. The RLC_PDU generating unit 107 acquires transmission control information from the transmission control information memory unit 109, re-transmission impossible information from the transmission-side re-transmission impossible information memory unit 21, information from the re-transmission buffer 104 and information from the transmission buffer 106 in this order until the size is reached, and generates RLC_PDU.

Among data held in the transmission buffer 106, data which was used by the RLC_PDU generating unit 107 is deleted. RLC_PDU which was generated in the RLC_PDU generating unit 107 using data held in the transmission buffer 106 is sent to the RLC_PDU transmitting unit 108. Also, the RLC_PDU is stored in the re-transmission buffer 104 as data transmitted.

In the re-transmission buffer 104, data waiting for re-transmission and data transmitted are stored. The RLC_PDU generating unit 107 uses the data waiting for re-transmission. The data waiting for re-transmission which the RLC_PDU generating unit 107 used will be the data transmitted. Although RLC_PDU which the RLC_PDU generating unit 107 generated using the data waiting for re-transmission held in the re-transmission buffer 104 is sent to the RLC_PDU transmitting unit 108, the RLC_PDU is not stored in the re-transmission buffer 104 as the data transmitted.

Although RLC_PDU which the RLC_PDU generating unit 107 generated by acquiring transmission control information stored in the transmission control information memory unit 109 and re-transmission impossible information of the mobile station 50 stored in the transmission-side re-transmission impossible information memory unit 21 is sent to the RLC_PDU transmitting unit 108, the RLC_PDU is not stored in the re-transmission buffer 104.

The RLC_PDU transmitting unit 108 transmits RLC_PDU generated by the RLC_PDU generating unit 107 to the MAC sublayer 53. RLC_PDU transmitted to the MAC sublayer 53 is sent, via the physical layer 54 and the radio unit 55, to the radio base station 60 via the radio link 70.

In case received RLC_PDU includes a request to report receiving condition, or in case it is necessary to detect reception failure and to report receiving condition, the RLC_PDU generating unit 107 prepares for generation of transmission control information. When RLC_PDU is generated, the RLC_PDU generating unit 107 generates transmission control information.

By the transmission control information which the RLC_PDU generating unit 107 generates, whether or not RLC_PDU has been received is notified the radio base station 60 from the mobile station 50 using RLC_SN in the format shown in FIG. 7 as ACK/NACK.

RLC_PDU sent from the mobile station 50 is received, via the radio link 70, by the MAC sublayer 63 via the radio unit 65 and the physical layer 64. The RLC_PDU receiving unit 85 in the radio base station 60 receives the RLC_PDU from the MAC sublayer 63.

Among RLC_PDU, transmission control information of the mobile station 50 is stored in the reception control information memory unit 90, and re-transmission impossible information is stored in the reception-side re-transmission impossible information memory unit 10. Information other than the transmission control information and the re-transmission impossible information included in the RLC_PDU is stored in the reception buffer 86.

In the reception buffer 86, using a sequence number (SN) of RLC_PDU, whether or not there exists a lack in reception of RLC_PDU is managed.

When RLC_PDU which follows the RLC_PDU corresponding to the last end of RLC_SDU generated last time is received, the RLC_SDU generating unit 87 acquires the RLC_PDU from the reception buffer 86 and generates RLC_SDU.

PLC_PDU which is, based on re-transmission impossible information of the mobile station 50 stored in the reception-side re-transmission impossible information memory unit 10, determined that it is impossible to receive at the radio base station 60 because the mobile station 50 does not re-transmit, interrupts the continuity mentioned above. The RLC_SDU generating unit 87 acquires next RLC_PDU excluding such RLC_PDU.

When there exists RLC_PDU which is received consecutively just after excluded RLC_PDU, the RLC_SDU generating unit 87 acquires the RLC_PDU which is received consecutively and generates RLC_SDU.

RLC_SDU generated by the RLC_SDU generating unit 87 is sent to the RLC_SDU transmitting unit 88, and is transmitted to the PDCP sublayer 61 from the RLC_SDU transmitting unit 88.

The format shown in FIG. 8 can notify that part of RLC_PDU cannot be re-transmitted. Accordingly, size of the data excluded by the RLC_SDU generating unit 87 is not limited to a unit of RLC_PDU which is notified that it is impossible to re-transmit. The size of the excluded data may be part of the RLC_PDU which is notified that it is impossible to re-transmit.

According to the second exemplary embodiment described above, in order to notify the opposing device that transmission-side does not re-transmit, the format shown in FIG. 8 includes re-transmission impossible information. However, using the format shown in FIG. 6, RLC_PDU may notify that it is impossible to re-transmit from the radio base station 60 to the mobile station 50, or from the mobile station 50 to the radio base station 60.

The transmission-side sets, for the format shown in FIG. 6, SN of RLC_PDU which is impossible to re-transmit in the SN field, and makes the Data field empty. Further, the transmission-side sets in the FI field that head of the Data field is head of RLC_SDU, and end of the Data field is end of RLC_SDU.

Because the Data field is empty and the FI field shows that RLC_PDU concludes, the reception-side determines that the RLC_PDU is impossible to re-transmit.

According to the mobile station 50 and the radio base station 60 according to the second exemplary embodiment, when data requested by the reception-side device is impossible to re-transmit, the transmission-side device transmits information that it is impossible to re-transmit to the reception-side device. Also, when the reception-side device receives information that data is impossible to re-transmit from the transmission-side device, the reception-side device receives data excluding the data which re-transmission is requested. That is, in ARQ re-transmission, that the data is impossible to re-transmit is notified, or the state that the data is impossible to re-transmit is detected. By these operations, disconnection of data communication is excluded.

[Third Exemplary Embodiment]

A mobile communication system according to the third exemplary embodiment of the present invention will be described with reference to FIGS. 3, 9 and 10.

FIG. 3 shows a structure of a mobile communication system 301 according to the third exemplary embodiment.

Further, a radio base station 360 and a mobile station 350 according to the third exemplary embodiment are identical with the radio base station 60 and the mobile station 50 according to the second exemplary embodiment described above respectively in the part except for RLC sublayers 352 and 362.

Figure 9:
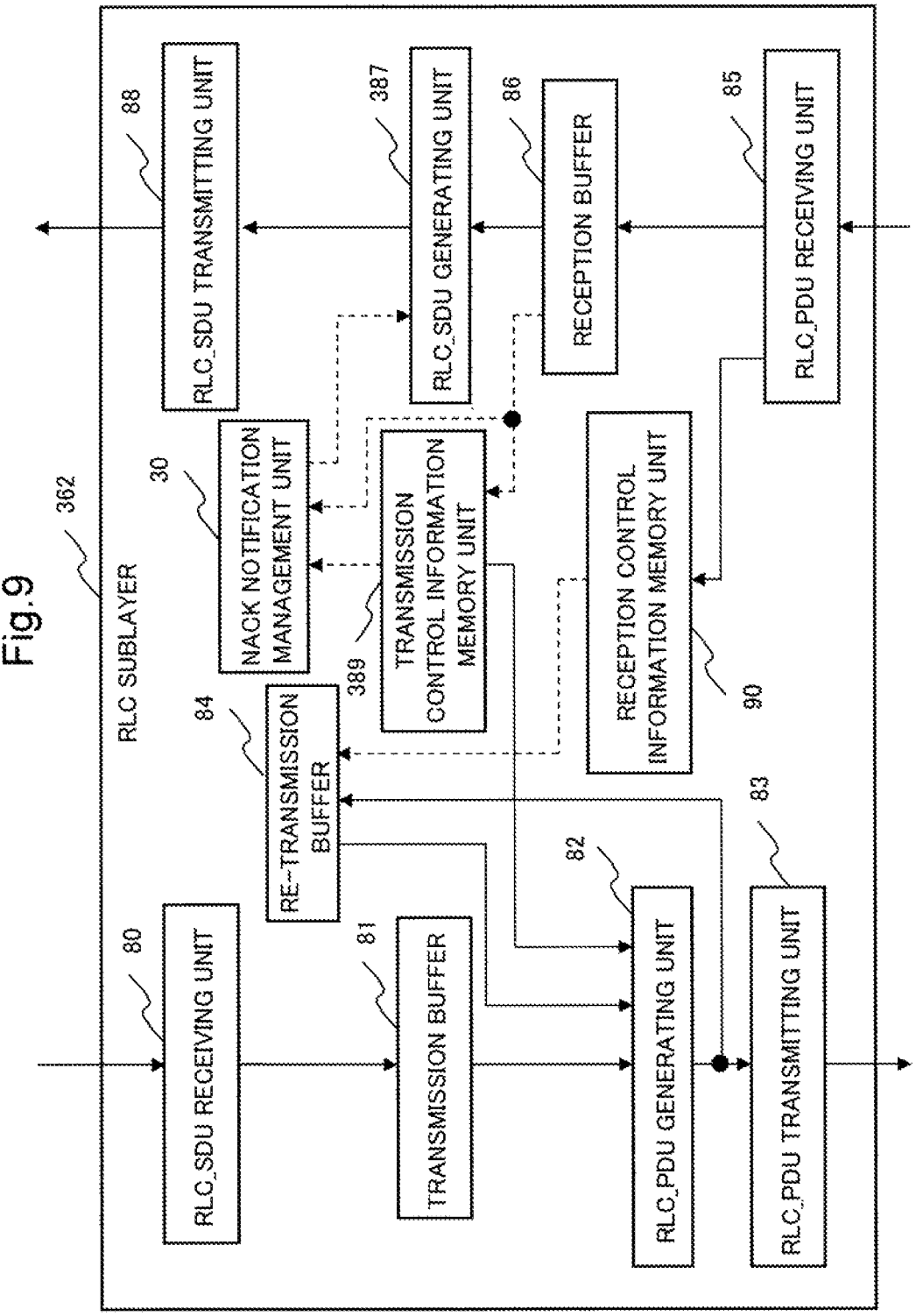
FIG. 9 shows a structure of an RLC sublayer in a radio base station according to the third exemplary embodiment.
Figure 10:
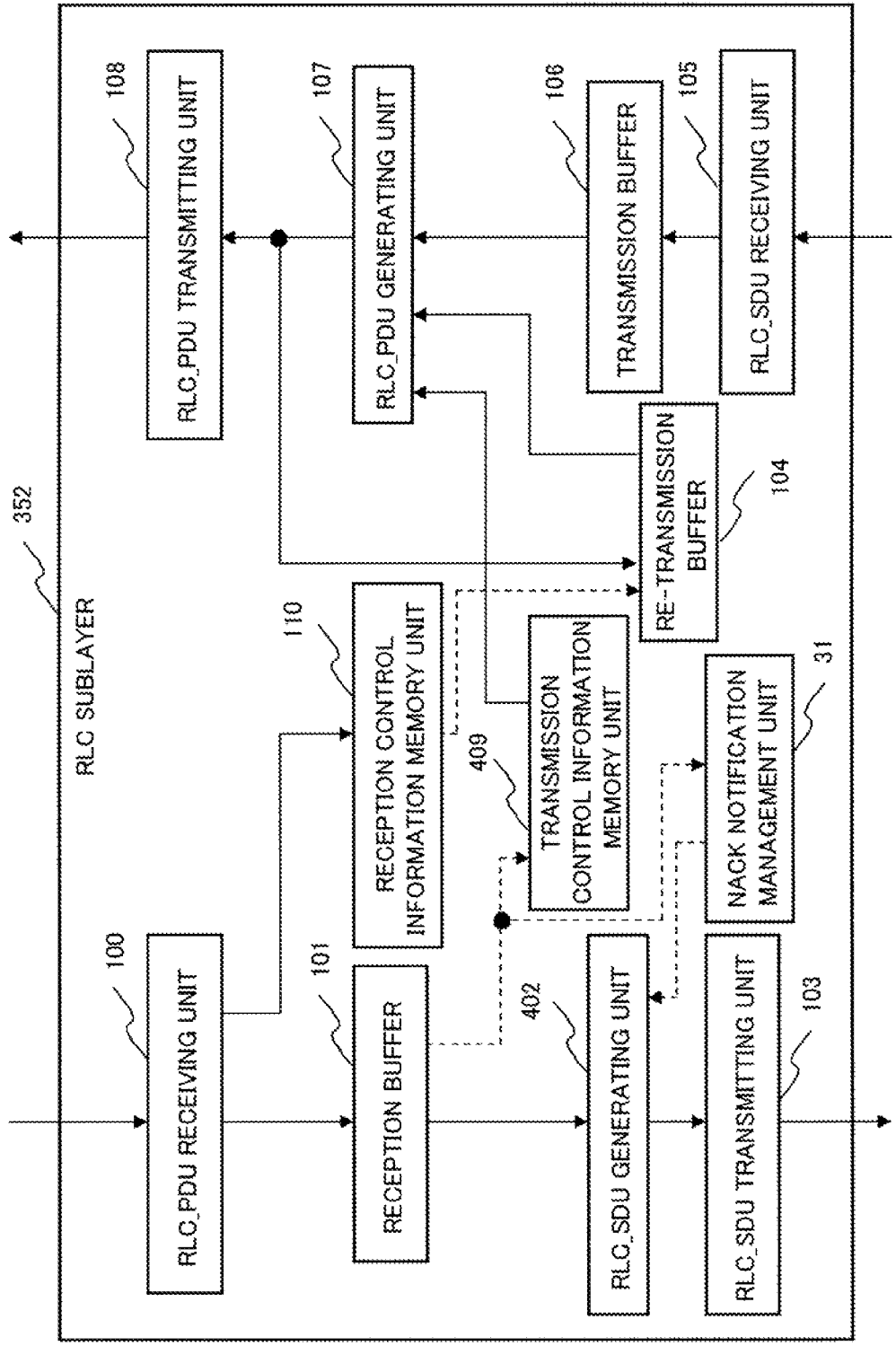
FIG. 10 shows a structure of an RLC sublayer in a mobile station according to the third exemplary embodiment.

FIGS. 9 and 10 show a structure of the RLC sublayer 362 in radio base station 360 and the RLC sublayer 352 in the mobile station 350 according to the third exemplary embodiment respectively.

Further, the RLC sublayers 362 and 352 according to the third exemplary embodiment are different in the structure partially from the RLC sublayers 62 and 52 according to the second exemplary embodiment described above. That is, because RLC_SDU receiving units 80 and 105, transmission buffers 81 and 106, RLC_PDU generating units 82 and 107, RLC_PDU transmitting units 83 and 108, re-transmission buffers 84 and 104, RLC_PDU receiving units 85 and 100, reception buffers 86 and 101, RLC_SDU transmitting units 88 and 103 and reception control information memory units 90 and 110 according to the third exemplary embodiment include the same structure and the same function respectively with the second exemplary embodiment, their description will be omitted or simplified below.

The RLC sublayers 362 and 352 include NACK notification management units 30 and 31 respectively. Also, RLC_PDU generating units 387 and 402 and transmission control information memory units 389 and 409 are different from the second exemplary embodiment in the structure and in the function respectively.

In the RLC sublayer 362 in the radio base station 360, the NACK notification management unit 30, the RLC_SDU generating unit 387 and the transmission control information memory unit 389 cooperate and function as data receiving means.

Also, in the RLC sublayer 350 in the mobile station 350, the NACK notification management unit 31, the RLC_SDU generating unit 402 and the transmission control information memory unit 409 cooperate and function as data receiving means.

Operations of the RLC sublayer 362 in the radio base station 360 and the RLC sublayer 352 in the mobile station 350 will be described with reference to FIGS. 9 to 11.

Further, because the operation of the RLC sublayer 352 in the mobile station 350 is identical with the operation of the RLC sublayer 362, the operation of RLC sublayer 362 in the radio base station 360 will be described below, and description of the operation of the sublayer 352 in the mobile station is omitted.

The NACK notification management unit 30 of the RLC sublayer 362 manages NACK notification based on transmission control information stored in the transmission control information memory unit 389. In case the NACK notification continues for predetermined time, it is determined that RLC_PDU including a sequence number (SN) of data for which NACK is notified is impossible to re-transmit in an opposing device. Also, by changing setting time of a timer which measures time the NACK notification continues, in the NACK notification management unit 30, predetermined time to determine that re-transmission is impossible can be changed.

Figure 11:
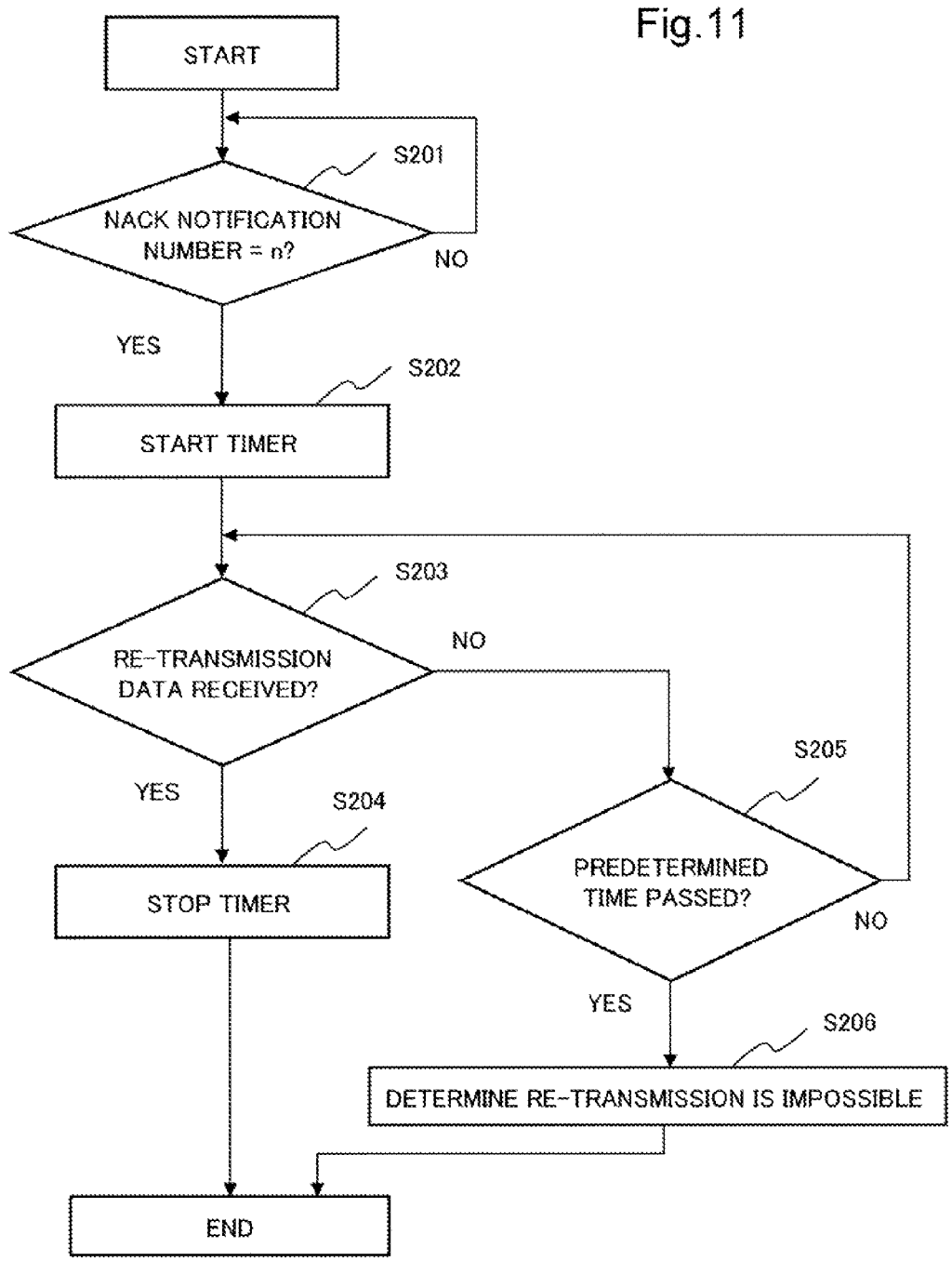
FIG. 11 shows a processing procedure of a NACK notification management unit according to the third exemplary embodiment.
Figure 12:
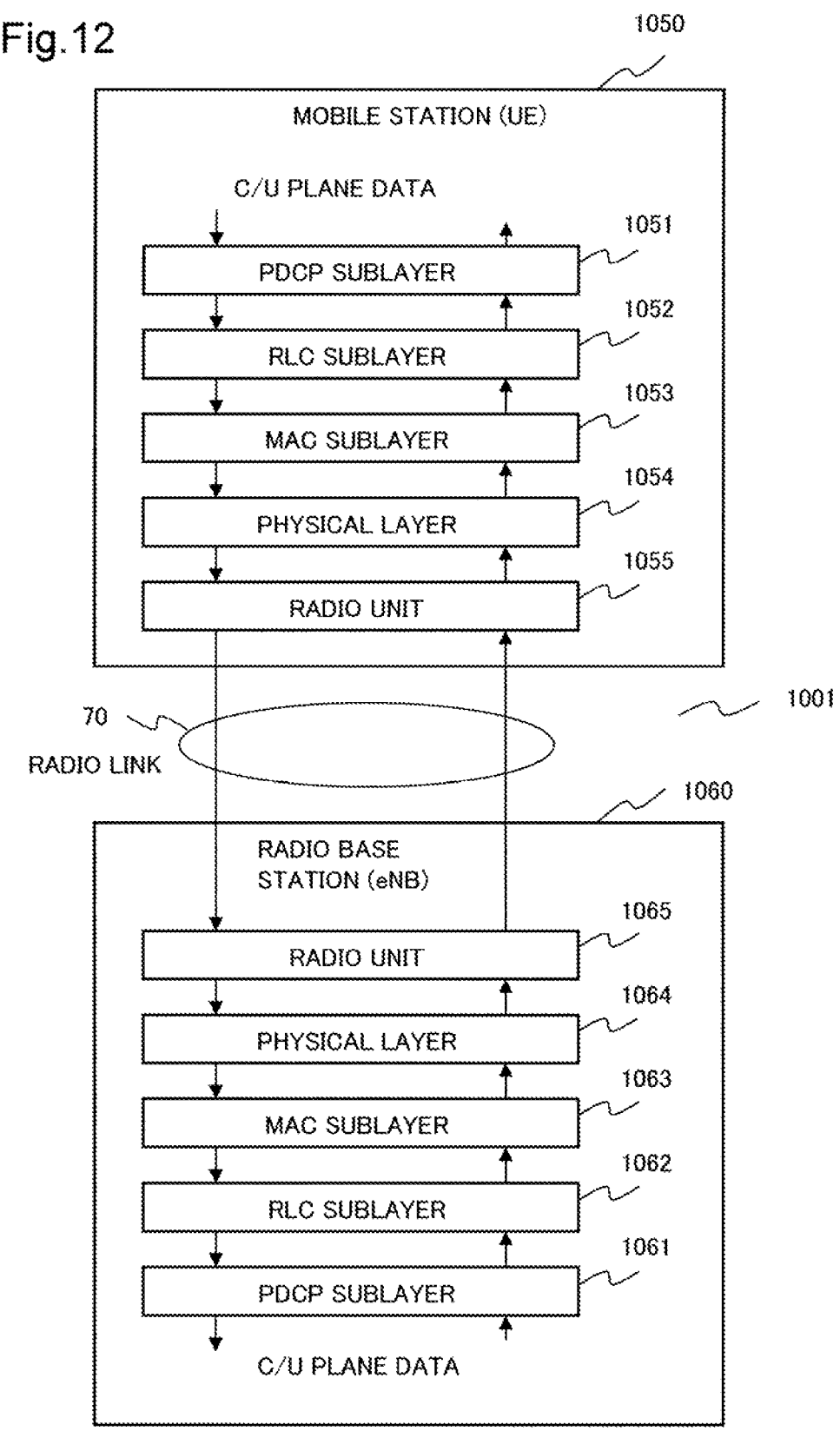
FIG. 12 shows a structure of a related mobile communication system.
Figure 13:
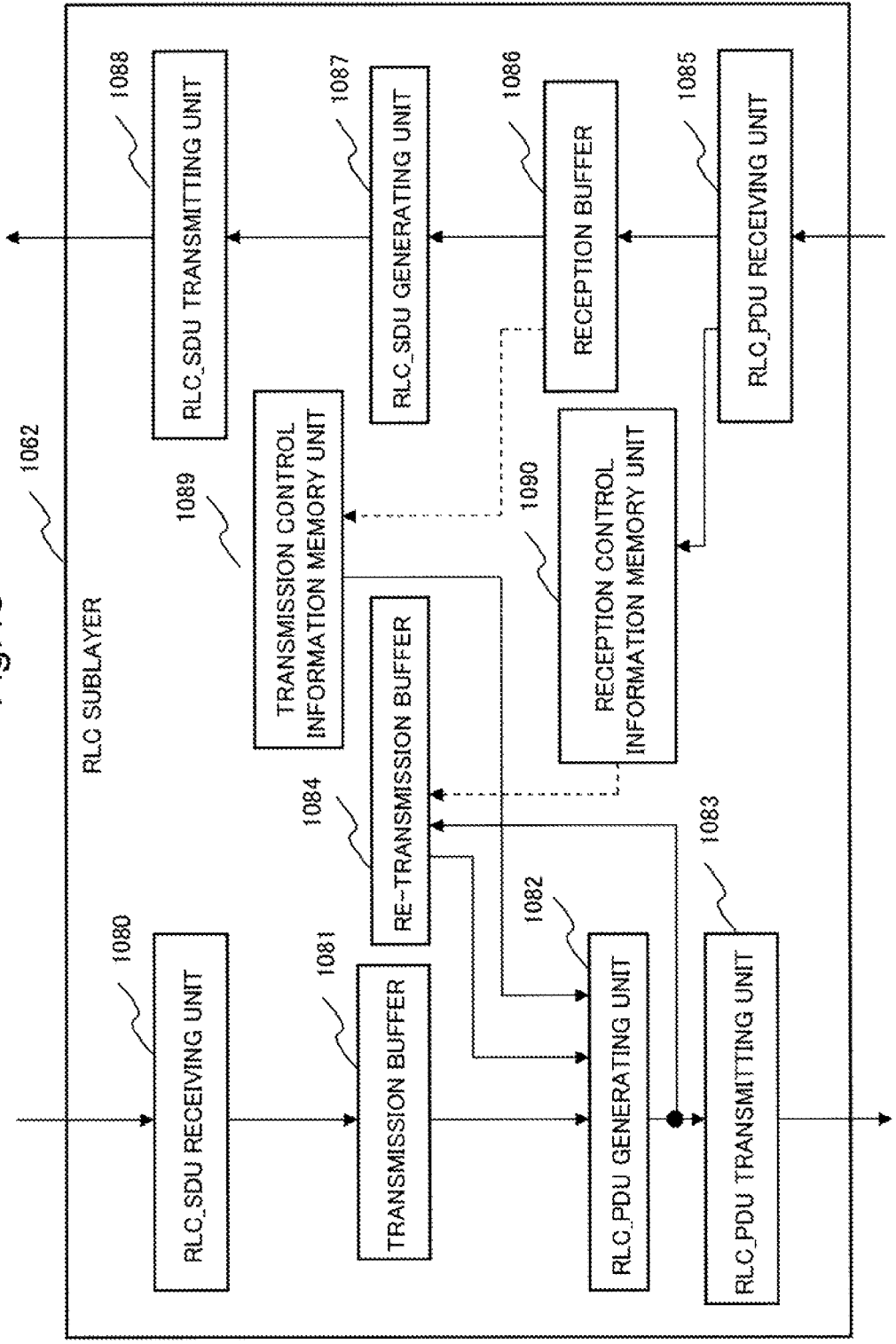
FIG. 13 shows a structure of an RLC sublayer in a related radio base station.
Figure 14:
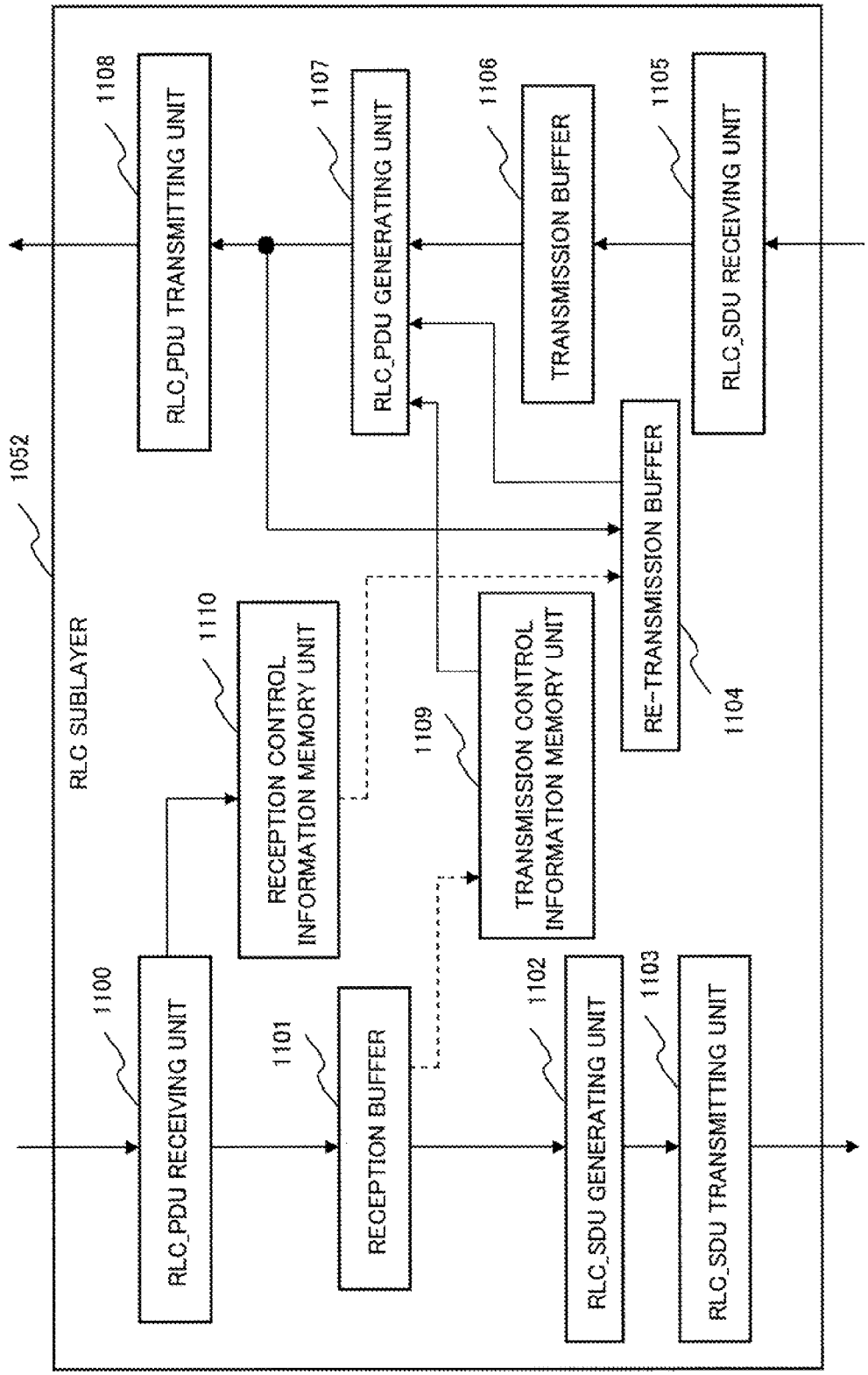
FIG. 14 shows a structure of an RLC sublayer in a related mobile station.

FIG. 11 shows a processing procedure of the NACK notification management unit 30 according to the third exemplary embodiment. Below, the procedure of processing of the NACK notification management unit 30 will be described with reference to FIG. 11.

When a first NACK notification is stored in the transmission control information memory unit 389, the NACK notification management unit 30 starts measurement of a number of times of the NACK notification.

When the NACK notification concerning a prescribed sequence number (SN) is received consecutively, the NACK notification management unit 30 counts the reception times of the NACK notification and compares the reception times with a predetermined integer n (n is an integer no smaller than 1) (Step S201).

When the NACK notification concerning the prescribed SN stored in the transmission control information memory unit 89 reaches n times (Yes in Step S201), the NACK notification management unit 30 starts the timer (Step S202).

The NACK notification management unit 30 determines whether or not re-transmitted data of the prescribed SN is received (Step S203).

In case re-transmitted data of the prescribed SN is received (Yes in Step S203), the NACK notification management unit 30 stops the timer and ends the processing (Step S204).

In case re-transmitted data of the prescribed SN is not received (No in Step S203), elapsed time measured by the timer is compared with a predetermined threshold value (Step S205).

In case the elapsed time is larger than the predetermined threshold value (Yes in Step S205), the NACK notification management unit 30 determines that it is impossible to re-transmit and ends the processing (Step S206).

In case the elapsed time is smaller than the predetermined threshold value (No in Step S206), returns to Step S203 and repeats the processing mentioned above.

As described above, according to the mobile station 350 and the radio base station 360 according to the third exemplary embodiment, when the re-transmitted data is not received even if the predetermined time has passed after re-transmission of data is requested to the mobile station 350, the RLC sublayer 362 in the radio base station 360 determines that it is impossible to re-transmit. That is, except for the data which is requested for re-transmission, data is received. Also, when re-transmitted data is not received even if re-transmission of data is requested to the mobile station 350 for the predetermined number of times, the RLC sublayer 362 in the radio base station 360 determines that it is impossible to re-transmit. That is, except for the data which is requested for re-transmission, data is received.

Even if reception-side does not receive the notification that it is impossible to re-transmit from transmission-side of the opposing device, the reception-side recognizes that requested data is not re-transmitted. That is, the radio base station 360 can judge autonomously that it is impossible to re-transmit without receiving re-transmission impossible information from the mobile station 350.

The case where the mobile station 350 requests re-transmission to the radio base station 360 is the same.

By the operation mentioned above, disconnected state in the communication between the radio base station 360 and the mobile station 350 can be excluded. The third exemplary embodiment includes a device structure and a processing procedure simpler than the second exemplary embodiment.

Processing of Steps S202, S204 and S205 in a flowchart of FIG. 11 may be omitted. In case the processing is omitted, when re-transmitted data with the prescribed SN is not received in spite of the NACK notification concerning the prescribed SN having reached n times, the NACK notification management unit 30 judges immediately that it is impossible to re-transmit. In this case, by setting a numerical value of n, time until the NACK notification management unit 30 judges that it is impossible to re-transmit can be changed. Similarly, in case a timer is used, by changing setting time of the timer, time until the NACK notification management unit 30 judges that it is impossible to re-transmit can be changed.

According to the flowchart of FIG. 11, because NACK notification is managed for each SN, size of data with which RLC_SDU generating unit 87 skips reception is not limited to an RLC_PDU unit which is judged to be impossible to re-transmit. The size of the data may be part of the RLC_PDU judged to be impossible to re-transmit.

The description mentioned above is effective even if the radio base station 360 and the mobile station 350 are exchanged.

Further, each part of the RLC sublayers 62 and 362 in the radio base stations 60 and 360 and the RLC sublayers 52 and 352 in the mobile stations 50 and 350 according to the second and the third exemplary embodiment may be structured by a general-purpose information processing device (CPU (Central Processing Unit), DSP (Digital Signal Processor) or microprocessor and so on) which operates by a prescribed program. For example, the general-purpose information processing device includes a memory, CPU and an input/output port. The CPU of the general-purpose information processing device reads a control program as the prescribed program from the memory and so on, and executes the control program. As a result, functions of each part of the RLC sublayers 62 and 362 in the radio base stations 60 and 360 and the RLC sublayers 52 and 352 in the mobile stations 50 and 350 are realized in the general-purpose information processing device. Also for other functions, functions which can be realized by software are realized by the general-purpose information processing device and a program.

Further, the control program which the general-purpose information processing device executes may be one which is, before shipment of the RLC sublayers 62 and 362 in the radio base stations 60 and 360 and the RLC sublayers 52 and 352 in the mobile stations 50 and 350, stored in such as the memory of the general-purpose information processing device, or may be one which is, after shipment of the RLC sublayers 62 and 362 in the radio base stations 60 and 360 and the RLC sublayers 52 and 352 in the mobile stations 50 and 350, stored in such as the memory of the general-purpose information processing device. Also, part of the control program may be one which is, after shipment of the RLC sublayers 62 and 362 in the radio base stations 60 and 360 and the RLC sublayers 52 and 352 in the mobile stations 50 and 350, stored in such as the memory of the general-purpose information processing device. The control program stored in such as the memory of the general-purpose information processing device after shipment of the RLC sublayers 62 and 362 in the radio base stations 60 and 360 and the RLC sublayers 52 and 352 in the mobile stations 50 and 350 may be, for example, one which installed those stored in a computer-readable recording medium such as CD-ROM, or one which installed those downloaded via a transmission medium such as the interim.

Also, the control program is not limited to a program which can be executed directly by the general-purpose information processing device, and may include a program which can be executed by installing it to a hard disk and so on. Also, a compressed program or an encrypted program may be included.

Although the present invention has been described with reference to an exemplary embodiment above, the present invention is not limited to the above-mentioned exemplary embodiment. Various changes which a person skilled in the art can understand may be performed in the composition of the present invention and details within the scope of the present invention.

Various changes can be performed to the exemplary embodiment mentioned above as far as it does not deviate from the point.

Although the exemplary embodiment mentioned above has been described by applying the present invention to a radio access network (E-UTRAN) in a mobile communication system of LIE method, it may be applied to a method other than that. That is, as far as it is a communication system in which a transmission-side device and a reception-side device communicate, it may be applied to an arbitrary method. Further, a transmission-side device and a reception-side device may be connected by a wired link.

This application claims priority based on Japanese Patent Application No. 2009-113953 filed on May 8, 2009 and the disclosure thereof is incorporated herein in its entirety.

Industrial Applicability

According to the present invention, in automatic repeat request (ARQ) re-transmission in the Acknowledged Mode (AM), disconnection of communication is prevented.

The invention claimed is:

1. A communication system, comprising:
a first communication device comprising a data transmitting unit and a data re-transmitting unit; and
a second communication device connected to said first communication device and comprising: a data receiving unit that receives data transmitted from said first communication device; and a data re-transmission requesting unit that requests to transmit re-transmission data which said data receiving unit did not normally receive, wherein
said data receiving unit determines whether or not the re-transmission data requested by said data re-transmission requesting unit is re-transmitted from said first communication, and wherein
said first communication device further comprises re-transmission impossible information transmitting unit that transmits to said second communication device re-transmission impossible information in response to the request to transmit re-transmission data, and
when said data receiving unit receives said re-transmission impossible information, said
data receiving unit determines that it is impossible to re-transmit.

2. The communication system according to claim 1, wherein said data receiving unit does not receive said re-transmission data when said re-transmission data is determined not to be re-transmitted.

3. The communication system according to claim 1, wherein when a predetermined time has passed after said data re-transmission requesting unit requested to transmit re-transmission data without receiving said re-transmission data, said data receiving unit determines that said re-transmission data is not re-transmitted.

4. The communication system according to claim 1, wherein when re-transmission data is requested and said re-transmission data is not received, said data re-transmission requesting unit requests again to transmit said re-transmission data, and
when said data re-transmission requesting unit requested to transmit said re-transmission data for a predetermined number of times, said data receiving unit determines that said re-transmission data is not re-transmitted.

5. The communication system according to claim 1, wherein the first communication device and the second communication device are connected via a radio link; and
said first communication device is a radio base station and said second communication device is a mobile station device, or said second communication device is a radio base station and said first communication device is a mobile station device.

6. A communication method for performing communication between a first communication device and a second communication device connected to said first communication device, comprising:
transmitting data from the first communication device to the second communication device;
determining whether or not the second communication device normally receives the data transmitted from the first communication device;
when the data was not normally received, requesting to transmit re-transmission data;
in the second communication device, determining whether or not said requested re-transmission data is re-transmitted from said first communication device;
transmitting re-transmission impossible information to said second communication device from said first communication device in response to the request to transmit re-transmission data; and
determining that it is impossible to re-transmit when said second communication device received said re-transmission impossible information.

7. The communication method according to claim 6, further comprising: not receiving said re-transmission data when said re-transmission data is determined not to be re-transmitted in the second communication device.

8. The communication method according to claim 6, further comprising, when a predetermined time has passed after said re-transmission data is requested without receiving said re-transmission data in said second communication device, determining that said re-transmission data is not re-transmitted.

9. The communication method according to claim 6, further comprising: when re-transmission data is requested and said re-transmission data is not received in said second communication device, requesting again to transmit said re-transmission data; and
when said re-transmission data is requested for a predetermined number of times, determining that said re-transmission data is not re-transmitted.

10. A non-transitory computer readable storage medium storing a program which makes a computer execute communication processing in a system, which includes: a first communication device and a second communication device connected to said first communication device, said processing comprising:
a process for transmitting data from the first communication device to the second communication device;
a process for determining whether or not the second communication device normally receives the data transmitted from the first communication device;
a process for, when the data is not normally received, requesting to transmit re-transmission data; and
a process for, in the second communication device, determining whether or not said requested re-transmission data is re-transmitted from said first communication device;
a process for transmitting re-transmission impossible information to said second communication device from said first communication device in response to the request to transmit re-transmission data; and
a process for determining that it is impossible to re-transmit when said second communication device received said re-transmission impossible information.

* * * * *